UNITED STATES PATENT OFFICE.

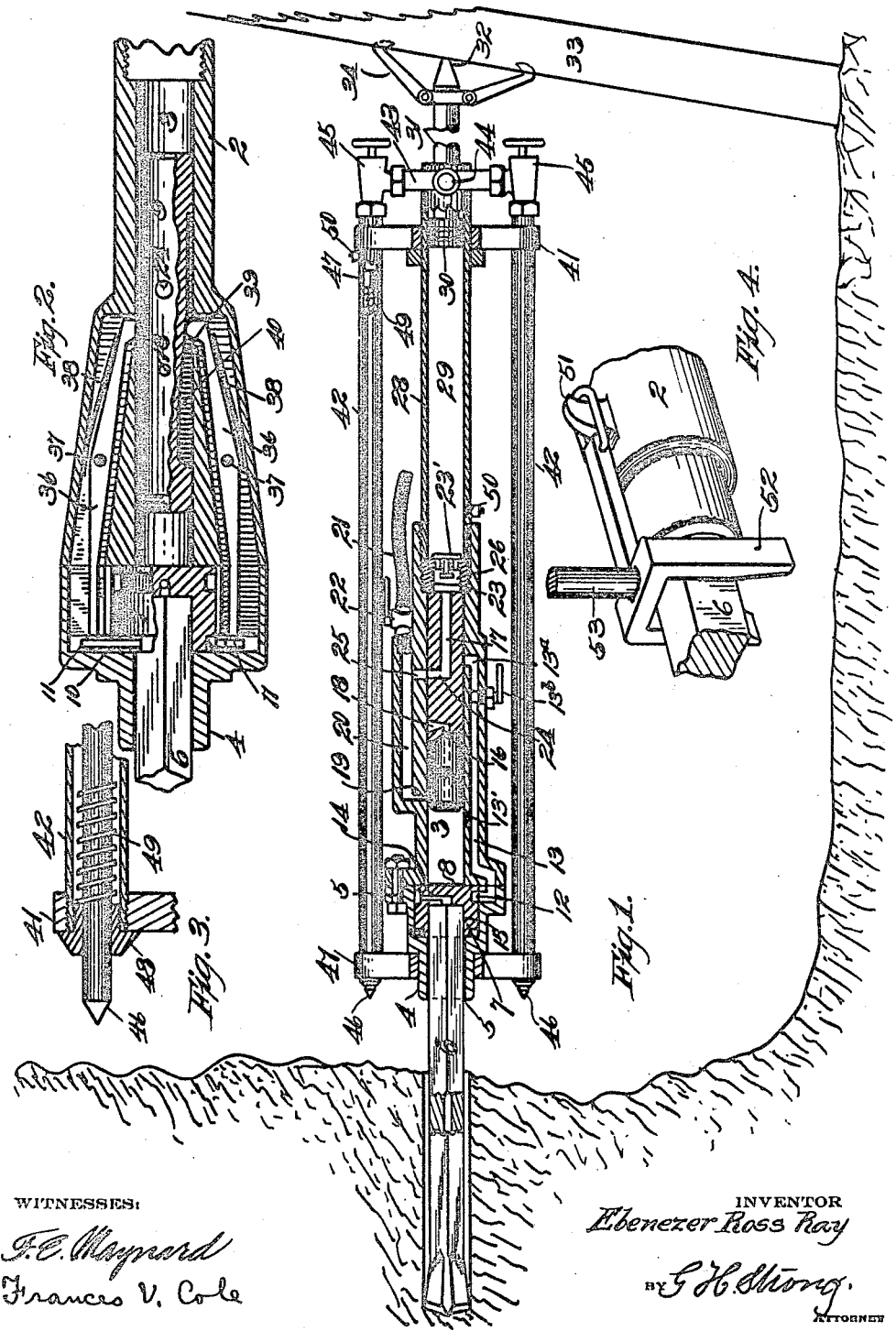

EBENEZER R. RAY, OF PLACERVILLE, CALIFORNIA.

PNEUMATIC FEED AND RETURN ROCK-DRILL.

1,077,856.  Specification of Letters Patent.  Patented Nov. 4, 1913.

Application filed September 28, 1912. Serial No. 722,873.

*To all whom it may concern:*

Be it known that I, EBENEZER R. RAY, a citizen of the United States, residing at Placerville, in the county of Eldorado and State of California, have invented new and useful Improvements in Pneumatic Feed and Return Rock-Drills, of which the following is a specification.

This invention relates to rock drills, and particularly to pneumatic drills.

The object of the present invention is to provide in pneumatic rock drills, means including a body portion having ports for admitting air to the interior of the drill body for driving a hammer or piston with percussive force, said piston being designed for coöperation with the air ports, so that air may be admitted into the body of the drill to return or retract the hammer piston after it has struck a blow.

A further object of the invention is to provide in a pneumatic drill, means whereby the drilling machine proper may, after having been advanced to the face of rock, be retracted by pneumatic pressure; to provide means in a pneumatic drill for automatically revolving the drilling bit or cutter, said means having the further function of controlling the drill hammer or piston against circumferential movement; and to provide a pneumatic drill having means whereby the drill body may be coupled to the shank of the drill bit to pull the latter from the drill hole when the drilling machine structure is pneumatically removed from adjacent to the face.

The invention consists of a drilling machine, including means for pneumatically driving and retracting a hammer, with means for pneumatically advancing the drilling machine toward and removing it from a rock face, and also consists in novel means for turning the drilling bit during operations.

Figure 1 is a longitudinal, diametric section through the drilling machine in the plane of the air conductors of the drilling machine. Fig. 2 is a diametric section of a portion of the drilling machine in the plane of the drill revolving device. Fig. 3 is a detail view of a portion of the projector frame. Fig. 4 is a fragmentary perspective of a drill withdrawing coupler.

In its illustrated embodiment, my invention comprises a main cylinder or body portion 2, which it is one of the objects of the present invention to design as compactly, and yet substantially, and as lightly as compatible with the practice. This cylinder or body portion 2 is shown as having a piston chamber 3, covered at its forward end by a removable chuck or collet 4, which may be secured by bolts 5 to the contiguous end of the body of the drilling machine. Within the chuck 4, which has an open mouth 5 through which may be inserted a drill 6, there is mounted a ratchet wheel or equivalent device 7, having a solid portion 8 facing inwardly and exposed to the chamber 3. Reciprocally mounted in the chamber 3 is a hammer or reciprocating piston 9. The ratchet wheel or socket block 7, against which the hammer 9 is adapted to strike percussively, is provided with teeth 10, engageable with operating pawls 11. The means for actuating these pawls will be more fully described hereinafter. The circumference of the ratchet wheel 7 is also provided with an annular groove 12, registering longitudinally with the adjacent end of an escape duct or passageway 13 formed in the drill body 2; the annular groove 12 communicating through a radial duct 14 to the interior square or polygonal socket portion 15 in the ratchet wheel, which socket is adapted to receive the correspondingly shaped end of the drill 6.

During the operation of the drill hammer 9, when it has been driven to the position shown in Fig. 1, with the inlet port 19 cut out, the air in the forward portion of the chamber 3 is relieved and escapes through and into the escape duct 13 by a port 13'. When the hammer 9 has been driven forward against the block end 8 and the feed port 25 cut off, the air behind the hammer will escape through a port 13ª, which communicates with the escape passage 13. The speed of the drill may be very effectually controlled by introducing in the escape passageway 13 a small controlling valve or cock 13ᵇ, which, when fully opened, allows the free escape of air from behind the piston through the passageway 13, and thence through the block 7 and through the hollow drill 6. If the valve 13ᵇ be turned partly off to partly close the passageway 13, then it is manifest that a back pressure will be created behind the piston 9, so that its force would be materially reduced and its speed checked.

The piston 9 is provided, as clearly shown in Fig. 1, with central independent ducts or passageways 16—17; the former communicating with a radial port 18 which is disposed at such a distance from the forward end of the hammer 9 that when the hammer assumes a position in the front end of the drill body 2, the port 18 registers with a feed port 19 communicating with a common air chamber 20, extending along the side of the drill body 2.

The chamber 20 is normally supplied with air under pressure through suitable air hose or other equivalent connection 21, in which is mounted a valve 22 by which the flow of air from the hose 21 into the air pressure chamber 20 may be controlled. When the valve 22 is open to allow pressure of air to accumulate in the pressure chamber 20, and assuming that the piston has reached a position in the forward end of the drill body 2 with the ports 18—19 registering, then the force of air from the pressure chamber 20 will, by passing through the alined ports and the passageway 16, accumulate in front of the hammer and react thereon to move the hammer rearwardly until it reaches a stop ring or valve cage 23, appropriately mounted in the drill body 2.

As the hammer or piston 9 moves rearwardly under the force of air pressure against its front end, the passageway 17 in the piston 9 is supplied with air under pressure by the alinement of two ports 24 formed in the piston 9, and 25 formed in the drill body 2, so that air under pressure thence passes from the air pressure chamber 20 through the alined ports 24—25, and traversing the passageway 17 reacts against the rear end of the hammer 9, filling a chamber 26 in the ring or valve cage 23. The accumulating air pressure therein then drives the hammer forwardly, again carrying the port 24 out of alinement with the port 25 in the drill body 2, and cutting off the supply of air. The blow of the hammer 9 under the force of the air strikes the block 7 which in turn transmits the force to the drill 6. Having struck a blow, the hammer is then pneumatically returned by the admission of air through the port 19 in the drill body 2 to the port 18 which admits air to the chamber in front of the hammer.

One of the peculiar and important features of the present invention is the means whereby the drill machine is automatically advanced toward the face of the rock to follow up the drill 6 as this digs its way through the rock. This means comprises a tubular extension or portion 28, formed upon or connected to the rear end of the drill body 2. This portion is provided with a drill chamber 29, in which is movable a piston 30, secured to an abutment rod 31 projecting through and supported in the end of the extension 28; the abutment 31 being provided with a point 32 which may be jammed against or stuck into a convenient wall, support, or column, here indicated as a timber 33. The abutment end 32 of the abutment rod 31 is provided with suitable hooks 34 which may grapple the support 33, thus securely preventing the up or down sliding of the point 32. From this it will be seen that one end of the drilling machine is supported by the abutment rod 31, with its impinging point 32 jammed against some permanent or sufficient support, as 33, and supported at its other end by the pressure of the drill 6 against the rock which is being operated upon. The pressure of the drill 6 is maintained constantly and pneumatically by the passage of air under pressure from the chamber 26 in the valve cage 23, in which is mounted a valve 23', adapted to open into the chamber 29 when the air delivered from the chamber 20 through the registering ports 24—25 and passageway 17 is greater than the pressure of air in the chamber 29. Since the full pressure of air in the chamber 20 is, by these registering ports and passageway, admitted to the chamber 29, it is evident that this pressure will be exerted to expand or relatively separate the abutment plunger 31, which is supported against the rigid support, as 33, and the drill body 2 which carries at its forward end the drill 6. Then in operation, as soon as the hammer on its return stroke carries the port 24 into registration with the port 25, the high pressure air in pressure chamber 20 will be allowed to enter the valve cage chamber 23 and open the valve 23' and pass into the chamber 20, replenishing the air pressure therein to compensate for the slight reduction when the blow of the hammer drives the drill through into the rock, and will also compensate for such leakage as may occur around the piston 30 of the abutment rod 31.

The preceding portion of the specification has defined the means for operating the hammer both by pneumatically advancing and pneumatically returning the same and described the means for causing, pneumatically, the advance of the drilling machine as the drill hole deepens, and a further important object of the invention is the means whereby the drill 6 is automatically rotated as the drilling proceeds.

The drill rotation means comprises the pawls 11 which are adapted to engage with the ratchet teeth 10 of the socket block or device 7; the ratchet 11 being appropriately mounted upon or joined to the ends of rock levers 25 which are disposed on diametrically opposite sides of the drill body 2 in chambers 36. Each of the levers is fulcrumed upon a pin 37 and normally pressed inwardly at their rear ends by respective springs 38; the function of the springs being to hold the levers 34 against the cam surfaces 39 formed on diametrically opposite sides of the hammer piston 9.

By forming the cam surfaces 39 at the bottoms of recesses or longitudinal channels 40 and causing the contiguous ends of the rocking levers 36 to enter the channels 40, these levers in addition to forming means for reciprocating the pawls 11, when the hammer 9 reciprocates, further have the function of preventing the rotation of the hammer 9 in its chamber 3, so as to maintain the proper alinement of the ports of the piston with the air feed ports of the drill feed 2.

In operation when the piston 9 is driven forward by the force of air admitted behind it, the ends of the levers 36 contacting with or bearing upon the cam surfaces 39 are caused to rock as the inclined portions of the cam surfaces pass under the adjacent ends of the levers 35. These levers are consequently rocked about their fulcrums 37, so that the pawls 11 will impinge against and rotate the ratchet wheel or socket block 7, which in turn will turn or revolve the drill 6 a portion of a revolution. As the piston 9 is returned to its starting point, by the admission of air through the ports 18—19 to the front end of the cylinder chamber 3, the piston cam surfaces 39 will slide beneath the adjacent ends of the levers 35 and the springs 38 of the latter will force them inwardly and retract the feed pawls 11 to an initial position again.

Another important object of the present invention is to provide means whereby, after the drill 6 has been driven to the working limit of the mechanism into the rock, the drilling machine can be pneumatically retracted or drawn away from the face of the rock and at the same time withdraw the drill from the drill hole. I accomplish this by providing a suitable framework or structure comprising transverse brackets 41—41 at the rear and forward ends of the drill, in which are securely mounted parallel cylinders or brace rods 42. I have shown these brace rods 42 as arranged on opposite sides of the drilling machine, and the rear ends of the cylinders 42 are connected to a common manifold 43, having a suitable air connection 44 whereby air under the desired pressure may be admitted through controlling cocks 45—45 into either one or the other or both of the side cylinders 42.

Telescoping within the cylinders 42 and projecting normally at the front end are push-rods 46—46, mounted in appropriate bearings 48 in the bracket 41 at one end of the drilling machine. The push-rods 46 have piston heads 47 at their inner ends snugly fitting the cylinders 42, so that when air is admitted through the cocks 45 behind the piston heads 47, which will be done after the drilling machine has been operated close up to the rock face, the force of the air behind the pistons 47 will project the push-rods 46 from the cylinders 42 against the face of the rock and react upon the drilling machine to force the latter away from the face of the rock and substantially stationary pistons 47; these being supported by the rods 46 resting upon the rock. So long as air under pressure is admitted through the air cocks 45 into the cylinders 42, behind the pistons 46, the drilling machine will be pneumatically forced away from the face of the rock to the desired position. During its rearward movement it is supported upon the abutment rod 31 until the drill 6 is finally withdrawn, when the apparatus can be readjusted for drilling another hole.

For the purpose of accomplishing the return movement of the push-rods 46, with their pistons 47, in the cylinders 42, I have shown the push-rods 46 as each surrounded with a spring 49, reacting between the bushings 48 and the pistons 47.

For the purpose of relieving back pressure behind the piston 30 of the abutment rod 31 and the pistons 47 of the push-rods 46, I provide suitable relief valves 50 which the operator will manipulate at such times as it is desired to permit the escape of air in the chambers behind the inwardly moving pistons, as 30 or 47.

When the drilling machine is being forced backwardly away from the rock face, it is desirable to positively connect the drilling machine to the drill 6 so as to insure the withdrawal of the drill from the hole. This I provide for by forming on one side of the drilling machine body 2 a radially projecting lug or spur 51, upon which is swiveled a clutch or clamp 52. This clamp 52 is adapted to firmly bite upon or otherwise engage the drill shank 6, so that as the drill body 2 moves rearwardly the drill shank 6 will move rearwardly also, and by forming a lever or handle portion 53 on the clamp 52 the latter may be oscillated so as to free the drill 6 when it becomes momentarily stuck in the hole.

Having thus described my invention, what I claim and desire to secure by Letters Patent is—

1. The combination in a rock drilling machine, of a body portion, means for supplying compressed air to a passageway in said portion, a piston chamber in the drill body within which is reciprocable a hammer piston operable by the air pressure, a tubular extension on the drill body to which compressed air is admitted, an abutment rod having a piston fitting the tubular extension, and upon which the air reacts to force the piston-rod outwardly and the drill body forwardly so that the drilling machine may be sustained while operating with the opposite end of the drilling machine supported upon a drill in the rock, and a pneumatically operable retractor supported at one end of said extension and at the opposite end of the drill body for retracting the machine and telescoping the abutment rod.

2. In a drilling apparatus, the combination with a drill body having an air pressure passageway, of means for supplying air under pressure to said passageway, a hammer chamber provided in the drill body, a hammer reciprocable in the drill body operative by the air admitted in the body, an abutment rod projecting from the opposite end of the drilling machine and adapted to engage a suitable support, said abutment rod having a piston movable in the contiguous portion of the drilling machine under air pressure, and a pneumatically operated mechanism for retracting the drilling machine away from the face of the rock, said retracting mechanism comprising tubular members attached to the drill body, valves for supplying air to said tubular members, and push-rods mounted in said tubular members and adapted to be projected therefrom by the force of compressed air, when admitted by the valves, the reaction of the air bringing the rods first into engagement with the rock face and subsequently reacting to force the drilling machine away from the same.

3. A rock drilling mechanism comprising a body portion having means for engaging the contiguous end of a cutting drill, means for retracting the drilling apparatus from the face of the rock, after the cutting drill has been driven in, and a pneumatically operated abutment rod acting oppositely to and coöperating with the drill to support the machine, said retracting means including cylinders having plungers projectable against the rock face for supporting the load of the mechanism at that end, and valves for controlling the admission of air into the cylinders to actuate the plungers.

4. A rock drilling mechanism comprising a body portion having means for engaging the contiguous end of a cutting drill, means for retracting the drilling apparatus from the face of the rock, after the cutting drill has been driven in, means for coupling the cutting drill to the drill body for extracting the cutting drill from the rock when the drilling apparatus is retracted, and a pneumatically operated abutment rod acting oppositely to and coöperating with the drill to support the machine, said retracting means including cylinders having plungers projectable against the rock face for supporting the load of the mechanism at that end, and valves for controlling the admission of air into the cylinders to actuate the plungers.

5. In a rock drilling machine, a cutting drill, a drill driving engine having a part engaging one end of the drill, an abutment rod engageable with a support and projecting oppositely from the engine to, and combining with, the drill to support the engine, a pair of parallel cylinders one on either side of the engine and turnably connected therewith, automatically telescoping push-rods in each cylinder having ends engageable with the rock face entered by the drill, and means for supplying air under pressure to said cylinders to project said rods against the rock and later force the machine in the opposite direction.

6. In a rock drilling machine, a cutting drill, a drill driving engine having a part engaging one end of the drill, an abutment rod engageable with a support and projecting oppositely from the engine to, and combining with, the drill to support the engine, a pair of parallel cylinders one on either side of the engine and turnably connected therewith, automatically telescoping push-rods in each cylinder having ends engageable with the rock face entered by the drill, and means for supplying air under pressure to said cylinders to project said rods against the rock and later force the machine and the drill in the opposite direction.

7. In a rock drilling machine, a cutting drill, a drill driving engine having a part engaging one end of the drill, an abutment rod engageable with a support and projecting oppositely from the engine to, and combining with, the drill to support the engine, a pair of parallel cylinders one on either side of the engine and turnably connected therewith, automatically telescoping push-rods in each cylinder having ends engageable with the rock face entered by the drill, and means for supplying air under pressure to said cylinders to project said rods against the rock and later force the machine and the drill in the opposite direction, said push-rods and the abutment plunger sustaining the engine when the drill is withdrawn from the rock.

In testimony whereof I have hereunto set my hand in the presence of two subscribing witnesses.

EBENEZER R. RAY.

Witnesses:
  JOHN H. HERRING,
  W. W. HEALEY.

Copies of this patent may be obtained for five cents each, by addressing the "Commissioner of Patents, Washington, D. C."